United States Patent [19]
Duffy

[11] 3,733,967
[45] May 22, 1973

[54] POWER STEERING MECHANISM FOR AUTOMOTIVE VEHICLES

[75] Inventor: James J. Duffy, Livonia, Mich.

[73] Assignee: Ford Motor Company, Dearborn, Mich.

[22] Filed: Apr. 5, 1971

[21] Appl. No.: 131,307

[52] U.S. Cl. ..................................91/375 A, 91/382
[51] Int. Cl. ..............................................F15b 9/10
[58] Field of Search..................91/368, 382, 380, 91/375 A

[56] References Cited

UNITED STATES PATENTS 3,292,499  12/1966  Duffy ......................................91/368
3,610,105  10/1971  Tomita ...................................91/368

*Primary Examiner*—Paul E. Maslousky
*Attorney*—John R. Faulkner and Donald J. Harrington

[57] ABSTRACT

A valve mechanism for use with a concentric power steering gear for an automotive vehicle comprising a torque input shaft and a steering worm connected to the input shaft through a torsion bar that permits relative angular displacement of the input shaft with respect to the worm, a valve spool and a registering valve sleeve controlling pressure distribution to pressure movable portions of the steering gear when torque is applied to the input shaft and a mechanical connection between the sleeve and the worm which is adapted to accommodate for misalignment of the input shaft with respect to the axis of the worm.

7 Claims, 6 Drawing Figures

INVENTOR:
James J. Duffy
BY:
ATTORNEYS.

POWER STEERING MECHANISM FOR AUTOMOTIVE VEHICLES

GENERAL DESCRIPTION OF THE INVENTION

This invention is an improvement in the power steering gear mechanism disclosed in my copending application Ser. No. 178,094, filed Sept. 7, 1971 and the power steering gear structure shown in U.S. Pat. No. 3,292,499, which is assigned to the assignee of this invention.

The steering mechanism of this disclosure, as well as the related disclosures, comprises a fluid pressure operated piston situated slidably within a pressure cylinder. The piston carries a gear rack which meshes drivably with a sector gear adapted for oscillation about an axis situated transversely with respect to the direction of motion of the piston. The sector gear is connected to a rocker shaft which in turn is connected through steering gear linkage elements to the vehicle dirigible wheels.

A steering worm shaft is disposed concentrically within the piston. It is connected drivably to the piston by means of a recirculating ball nut connection.

The steering worm shaft is held axially fast with respect to the steering gear housing by means of suitable thrust bearings. Upon rotation of the worm shaft the piston is caused to move thereby causing oscillation of the rocker shaft.

The piston cooperates with the cylinder to define a pair of opposed pressure chambers. Valve structure located in a valve housing supported by the steering gear housing controls distribution of pressure from a power steering pump to each of the pressure chambers.

The valve structure includes a valve sleeve mounted within the valve housing. A valve spool is positioned concentrically within the sleeve and is connected to a torque input shaft for the steering gear mechanism by means of a cam actuator. The torque input shaft in turn is connected to the steering worm shaft by means of a torsion rod which deflects as steering effort is applied to the input shaft. The valve sleeve is connected mechanically to the steering gear worm shaft so that when the input shaft is adjusted angularly with respect to the worm shaft upon torsional deflection of the torsion rod, the valve spool is shifted in one direction or the other depending upon the direction of application of the torque. In this way selective distribution to either pressure chamber can be accomplished to assist the manual steering effort supplied to the shaft.

One problem associated with valve arrangements of this type is caused by misalignment of the torque input shaft with respect to the axis of the worm shaft. Such misalignment may occur due to normal manufacturing tolerances. The torque input shaft is journalled independently of the worm shaft, the position of the latter depending upon the concentricity of the internally threaded grooves in the piston which form a part of the ball-nut connection and by the concentricity of the cylinder itself. If misalignment occurs, and if the axis of the input shaft should be askewed with respect to the axis of the worm shaft, binding may occur in the valve actuator, thereby causing erratic operation of the valve spool. The valve spool will experience a stray motion with respect to the valve sleeve if there is any misalignment when the input shaft rotates about its axis during turning maneuvers.

The improved valve structure of my invention overcomes this stray motion and the valve binding problem which are characteristic of concentric fluid pressure distributor valve arrangements in concentric power steering gear mechanisms of known design.

My improved valve structure includes an articulated mechanical connection between the valve spool and the steering worm shaft which will cause a positive rotary driving connection between the worm shaft and the valve sleeve, although angular adjustment of the valve sleeve with respect to the worm shaft may take place at the location of the articulated connection.

The torque input shaft is journalled by means of a radial load bearing within the valve housing at its outboard end. Its inboard end is piloted with respect to the worm shaft so that rotation of the input shaft during turning maneuvers may take place notwithstanding misalignment. The valve sleeve and the valve spool of my improved valve structure are adapted to follow substantially the transverse motion of the input shaft during rotation of the input shaft with respect to the housing so that precise valve registry is maintained and the stray motion of the valve elements with respect to the cam actuator and the input shaft is eliminated.

PARTICULAR DESCRIPTION OF THE INVENTION

Figure 1:
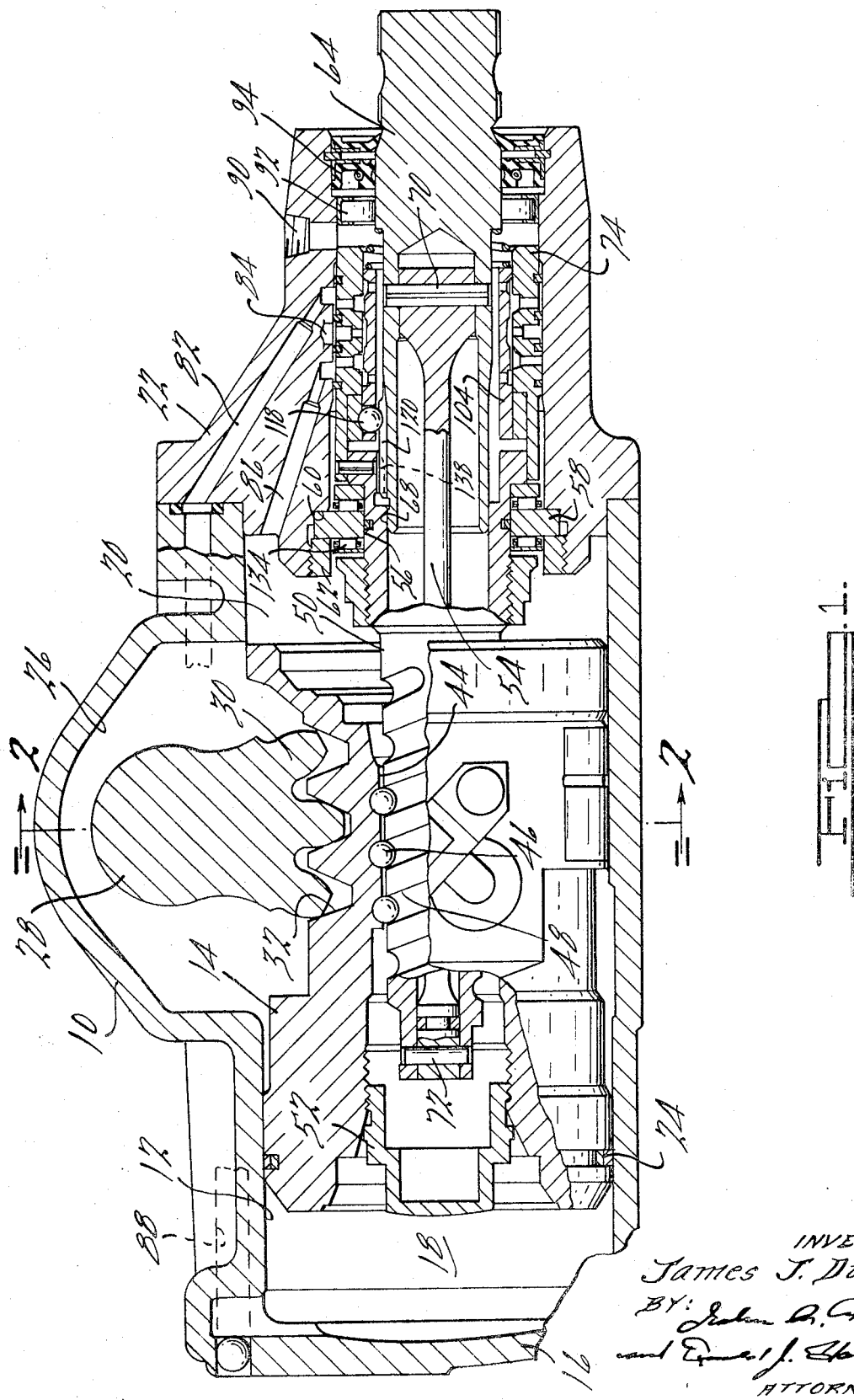
FIG. 1 shows in longitudinal cross-sectional form a steering gear mechanism embodying the improved valve structure of my invention.
Figure 2:
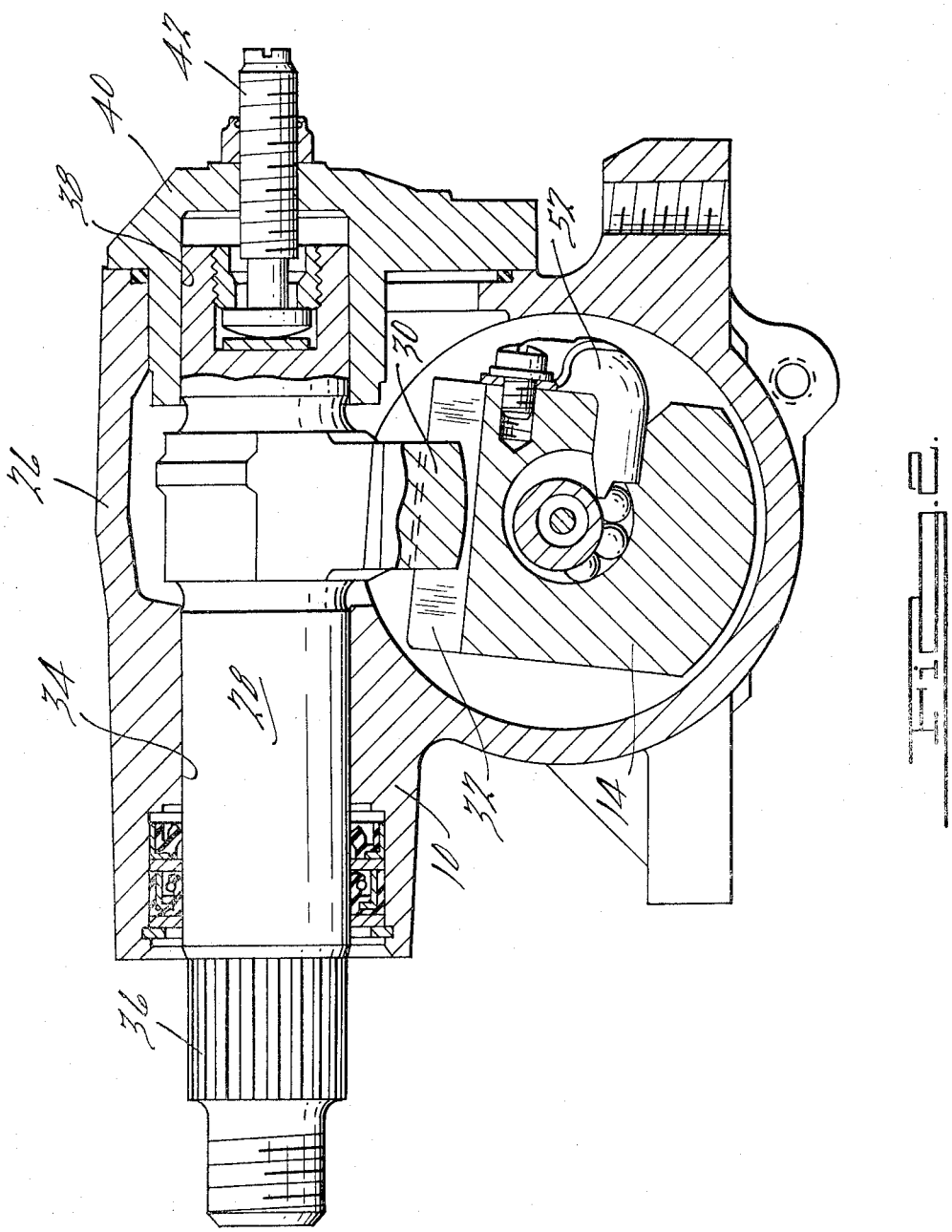
FIG. 2 is a cross-sectional view taken along the plane of section line 2—2 of FIG. 1.
Figure 3:
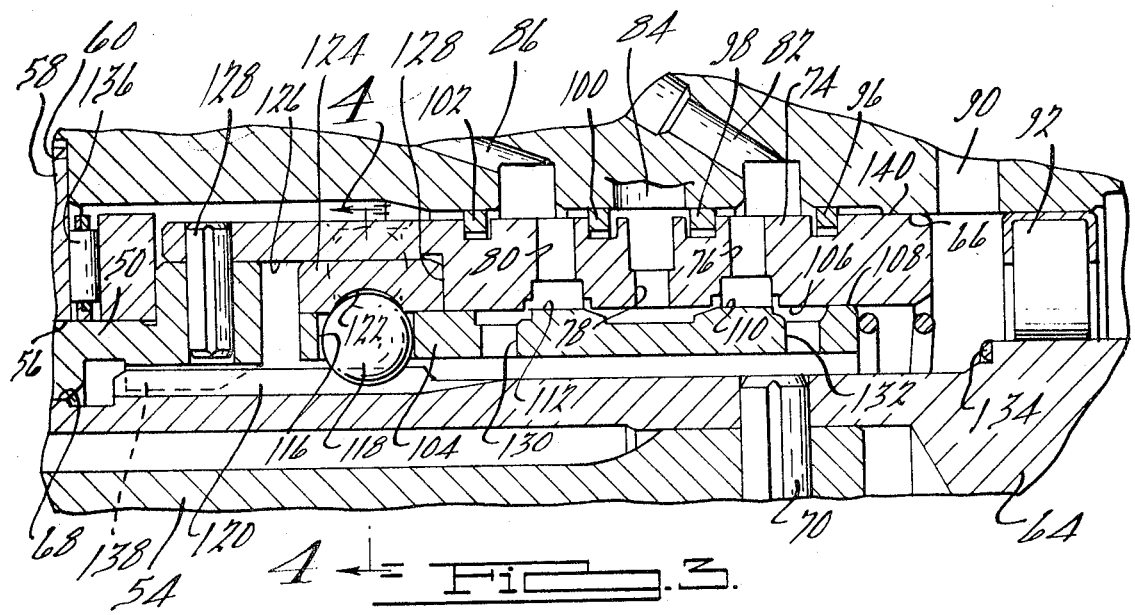
FIG. 3 is an enlarge view showing in longitudinal cross-section the valve mechanism of FIG. 1.

In FIGS. 1 and 2 reference character 10 designates a power steering gear housing. Housing 10 defines cylinder 12 within which is positioned slidably power steering piston 14. Piston 14 cooperates with the housing 10 and the end wall 16 to define a pressure chamber 18. Piston 14 cooperates also with housing 10 to define pressure chamber 20 located on the right-hand side of the piston 14. Chamber 20 is partly defined by valve housing 22 which is secured over the open end of housing 10 by means of bolts. Pressure chamber 18 is separated from pressure chamber 20 by seal ring 24 surrounding piston 14.

Housing 10 includes enlargement 26 within which is positioned rocker shaft 28. Gear sector 30 formed on the rocker shaft 28 meshes drivably with gear rack teeth 32 formed on piston 14. Rocker shaft 28 is journalled in opening 34 in housing 10. The outboard end of rocker shaft 28 is splined at 36 to permit a driving connection with a steering linkage member. The other end of rocker shaft 28 is journalled in bearing opening 38 in the housing member 40, which is bolted or otherwise secured to housing 10. Adjusting screw 42 received through a threaded opening in the member 40 engages the rocker shaft 28. It may be adjusted to eliminate backlash at the meshing engagement of the teeth of the sector gear 30 with rack teeth 32, the latter being transversely tapered, as indicated in FIG. 2.

Piston 14 is formed with central opening 44 having internal ball grooves that receive recirculating balls 46. Balls 46 register also with external helical grooves 48 formed in worm shaft 50 which extends through opening 44.

Upon rotation of worm shaft 50, balls 46 circulate about the axis of worm shaft 50 and impart axial forces on the piston 14. When the balls reach the end of their circuit, they are returned to the beginning of the circuit through return channel 52.

The left-hand end of opening 44 is closed by threaded closure member 52 which is received within the threaded end of the piston 14. Worm shaft 50 has a central opening through which torsion rod 54 extends.

The right-hand end of worm shaft 50 is received within pilot opening 56 formed in thrust ring 58, the latter being held against shoulder 60 in housing 22. It may be held in place by externally threaded lock nut 62. Torque input steering shaft 64 extends through central valve opening 66 in the housing 22. The left-hand end of the steering shaft 64 is piloted at 68 within the central opening in the worm shaft 50. One end of the torsion bar 54 is pinned to the steering shaft 64 by cross pin 70. The inner end of torsion bar 54 is pinned to the worm 50 by means of cross pin 72. Torque applied to steering shaft 64 then is transmitted to worm shaft 50 through torsion bar 54 during turning maneuvers.

Valve sleeve 74 is rotatably positioned in the valve opening 66. It is formed with radial ports 76, 78 and 80 at spaced locations. These ports register, respectively, with right-hand steering pressure passage 82, inlet pressure passage 84 and left-hand steering pressure passage 86. Passage 82 extends to crossover passage 88 formed in the housing 10, which passage communicates with working chamber 18. Passage 86 communicates directly with pressure chamber 20. Passage 84 communicates with a suitable fluid pressure inlet fitting. The right-hand end of sleeve 74 communicates with exhaust port 90.

The right-hand end of the steering shaft 84 is journalled in an extension of the housing 22 by means of roller bearing 92. Fluid seal 94 is located between the shaft 64 and the housing 22. Seal rings are located on either side of each of the ports 76, 78 and 80, as indicated at 96, 98, 100 and 102. Valve spool 104 is slidably positioned within central opening 106. It is formed with external valve lands 108, 110, 112 and 144 which register with internal valve lands formed in the sleeve 74.

Valve spool 104 is formed with radial opening 116 which receives cam ball 118. The cam ball registers with axially extending groove 120 formed in steering shaft 64 and with internal helical cam groove 122 formed in valve actuator ring 124. This ring is received within circular opening 126 formed in an extension of the valve sleeve 74 and it engages annular shoulder 127. It is secured by suitable fastening means, such as retainer ball 123, so that it forms an integral part of the valve sleeve 74.

Worm shaft 50 is received within the extension of valve sleeve 74. It is pinned to the extension by a grooved pin 128 which is adapted to permit slight angular adjustment of the sleeve 74 with respect to the worm shaft 50 although the sleeve is held axially fast with respect to the worm shaft. Similarly, pin 70 is adapted to permit slight angular movement of shaft 64 relative to torsion bar 54.

Exhaust ports 130 and 132 are formed in valve spool 104. They communicate with the central cavity in the valve spool and with the exhaust port 90 in the housing 22.

A valve spring 134 is seated on a shoulder formed on the steering shaft 64. It engages one end of the valve spool 104 and urges the latter against the cam ball 118 thereby eliminating backlash between actuator ring 124 and spool 104.

The worm shaft 50 is held axially fast by spaced radial thrust bearings 136 and 134 which engage the reaction ring 58.

When torque is supplied to shaft 64 the worm shaft, which is operatively connected through the recirculating ball-nut connection to a member that resists movement, the torsion bar 54 deflects. This causes the cam ball 118 to move through the grooves 120 and 122 then effecting axial displacement of valve spool 104. If torque is applied to shaft 64 in one direction, spool 104 is shifted in a first direction. If the direction of torque is reversed, the spool shifts in the opposite direction.

If spool 104 shifts in a left-hand direction, communication between inlet port 78 and the left-hand steering pressure passage 86 is increased and the communication between port 80 and the exhaust port 130 is decreased. Simultaneously, the degree of communication between inlet port 78 and the right-hand steering pressure passage 82 is decreased, and communication between port 76 and exhaust port 132 is increased. Thus, the working pressure in working chamber 20 is increased and the working pressure in chamber 18 is decreased. This causes a left-hand steering maneuver. The pressure unbalance across the piston 14 supplements the steering effort distributed to the worm shaft through the torsion bar 54.

If the shaft 64 should become misaligned with respect to the axis of the worm shaft during assembly, a slight articulation of the valve sleeve 74 with respect to the worm shaft will occur as the shaft 64 is rotated. In such instances, the pilot portion 68 would act as the apex of a cone of revolution upon rotation of the shaft 64. The valve sleeve, however always will be maintained in parallel disposition with respect to the shaft 64 and the stray motion of the valve during operation is avoided. Also binding between the cam ball 118 and the valve actuator 124 is prevented since the valve sleeve, the valve spool 104 and the grooved portion of shaft 64 always will be maintained in precise alignment.

Figures 4, 5:
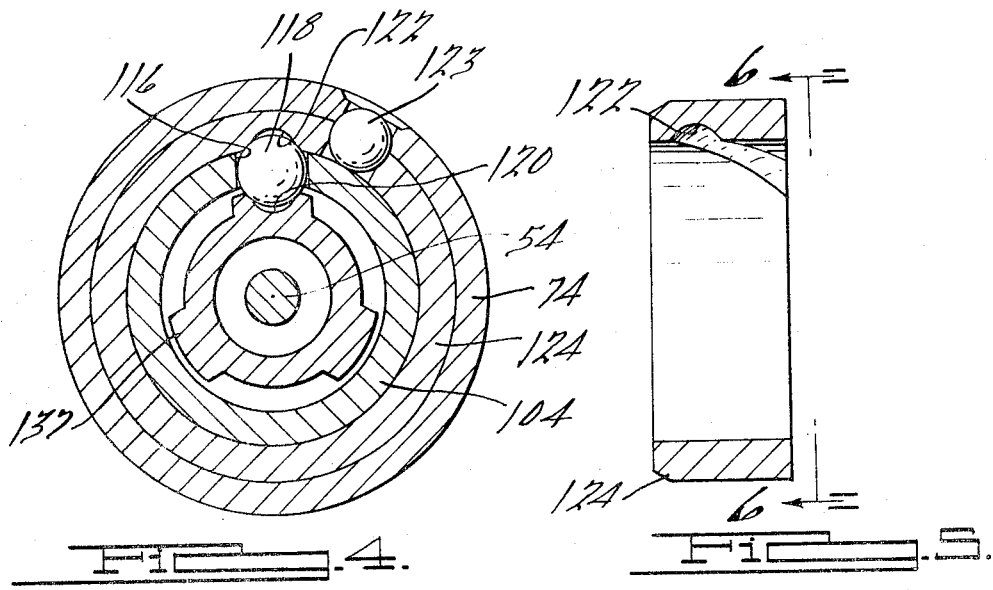
FIG. 4 is a cross-sectional view taken along the plane of section line 4—4 of FIG. 3.
FIG. 5 is a cross-sectional view of the valve actuator ring shown in the assembly of FIG. 3.
Figure 6:
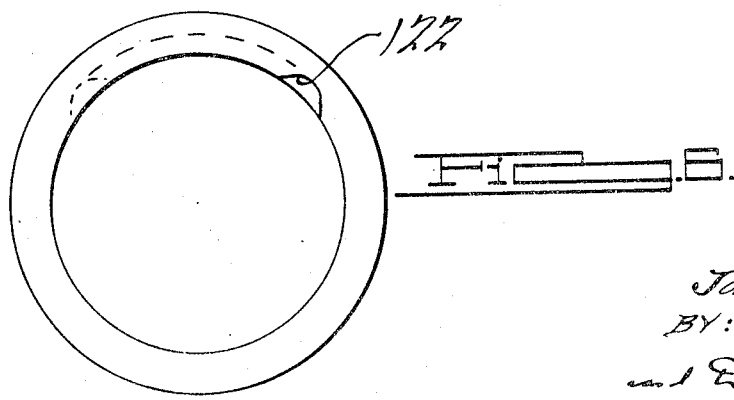
FIG. 6 is an end view of the ring of FIG. 5 as seen from the plane of section line 6—6 of FIG. 5.

As seen at FIG. 4, groove 120 is formed in one of three axially extending lugs 137. A cooperating tooth 138 in the end of worm shaft 50 is received between two of the lugs 137, thereby providing a stop that limits the degree of flexure of the torsion bar 54 as steering torque is applied to the shaft 64.

The valve sleeve is formed with an annular pilot surface 140 at its right-hand end, thereby locating the valve sleeve with respect to the valve chamber 66. The surface is located relatively close to the bearing 92 so that the geometric axis of the sleeve 74 will at all times be substantially coincident with the axis of the shaft 64 regardless of misalignment of the latter with respect to the valve chamber 66.

Having thus described a preferred embodiment of my invention, what I claim and desire to secure by U.S. Letters Patent is:

1. A power steering mechanism comprising a steering shaft, a driven shaft, a cylinder, a piston mounted for reciprocation in said cylinder, a worm shaft mounted coaxially within said piston, a helical screw connection between said worm shaft and said piston whereby rotation of said worm shaft effects reciprocation of said piston in one direction or the other depending upon the direction of rotation of said worm shaft, a torsion bar connecting said steering shaft and said worm shaft whereby torque applied to the former is distributed to the latter therethrough, pilot means for piloting one end of said steering shaft on said worm shaft, said torsion bar being adapted to yield to permit limited angular displacement of said steering shaft with respect to said worm shaft upon application of steering torque to said steering shaft, a geared connection between said driven shaft and said piston whereby the latter is rotated upon reciprocation of said piston, a valve housing connected to said cylinder, a valve sleeve in said valve housing coaxially arranged with respect to said worm shaft, a valve spool slidably situated in said valve sleeve, said valve spool and said valve sleeve having cooperating annular valve lands, a pressure inlet passage, pressure outlet passages extending to opposed sides of said piston, said valve lands cooperating with said passages to control the degree of communication between said inlet passage and each of the said outlet passages, an internal helical cam groove formed in a valve portion connected to said valve sleeve, a groove formed in said steering shaft, a ball cam element registering with said grooves, means for urging said valve spool into engagement with said ball cam element whereby axial displacement of the latter effects valve adjustment of said valve spool with respect to said valve sleeve, bearing means for journalling the other end of said steering shaft in said valve housing, said valve sleeve being piloted at one end thereof in said valve housing at a location proximate to said steering shaft bearing means and an articulated mechanical connection between said valve sleeve and said worm compensating for angular displacement of said steering shaft with respect to said worm shaft thereby tending to maintain said sleeve and said shaft in generally parallel disposition, a radial clearance being provided between an outer surface of said valve sleeve and the surrounding valve housing to accommodate radial displacement of said valve sleeve do to said angular displacement upon rotation of said steering shaft.

2. The combination as set forth in claim 1 wherein said articulated connection comprises telescoping portions on said worm shaft and said sleeve whereby said sleeve is disposed around one end of said worm shaft, aligned openings in said telescoped portions and a pin in said aligned openings whereby said valve sleeve is held axially fast with respect to said worm shaft, said pin accommodating limited angular displacement of said sleeve with respect to said worm shaft.

3. The combination as set forth in claim 1 including seal rings surrounding said sleeve adapted to prevent leakage from said inlet passage to said outlet passages and to prevent shortcircuiting of pressure to the exhaust region.

4. The combination as set forth in claim 2 including seal rings surrounding said sleeve adapted to prevent leakage from said inlet passage to said outlet passages and to prevent short-circuiting of pressure to the exhaust region.

5. The combination as set forth in claim 1 wherein adjacent ends of said worm shaft and said steering shaft are piloted one within the other, said valve sleeve having end pilot surfaces rotatably engaging the surrounding wall of said valve chamber, one of said pilot surfaces being disposed relatively close to the bearing means journalling said steering shaft in said valve housing.

6. The combination as set forth in claim 2 wherein adjacent ends of said worm shaft and said steering shaft are piloted one within the other, said valve sleeve having end pilot surfaces rotatably engaging the surrounding wall of said valve chamber, one of said pilot surfaces being disposed relatively close to the bearing means journalling said steering shaft in said valve housing.

7. The combination as set forth in claim 3 wherein adjacent ends of said worm shaft and said steering shaft are piloted one within the other, said valve sleeve having end pilot surfaces slidably engaging the surrounding wall of said valve chamber, one of said pilot surfaces being disposed relatively close to the bearing means journalling said steering shaft in said valve housing.

* * * * *

UNITED STATES PATENT OFFICE
CERTIFICATE OF CORRECTION

Patent No. 3,733,967      Dated May 22, 1973

Inventor(s) James J. Duffy

It is certified that error appears in the above-identified patent and that said Letters Patent are hereby corrected as shown below:

Column 3, line 43, cancel "84" and substitute --64--; line 51, after the numeral "110" cancel the comma and substitute --and--; same line, cancel "and 144".

Column 5, line 20, cancel "latter" and substitute --former--.

Signed and sealed this 15th day of October 1974.

(SEAL)
Attest:

McCOY M. GIBSON JR.
Attesting Officer

C. MARSHALL DANN
Commissioner of Patents